July 6, 1943.  A. H. MASCHMEYER  2,323,825
TABULATING MACHINE
Filed Aug. 9, 1940  10 Sheets-Sheet 2

INVENTOR
A. H. MASCHMEYER
BY W. A. Spark
ATTORNEY

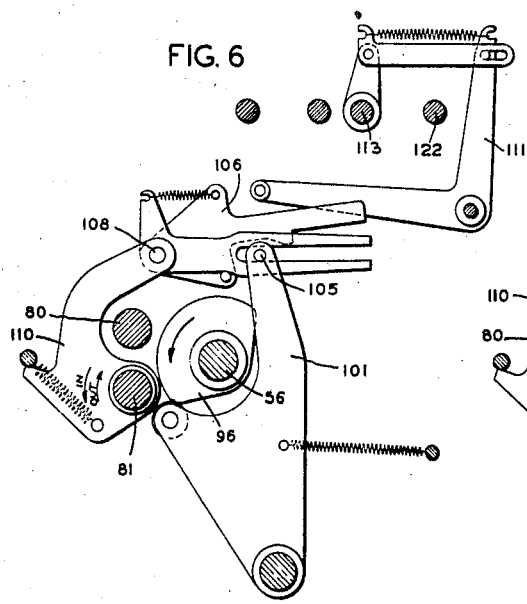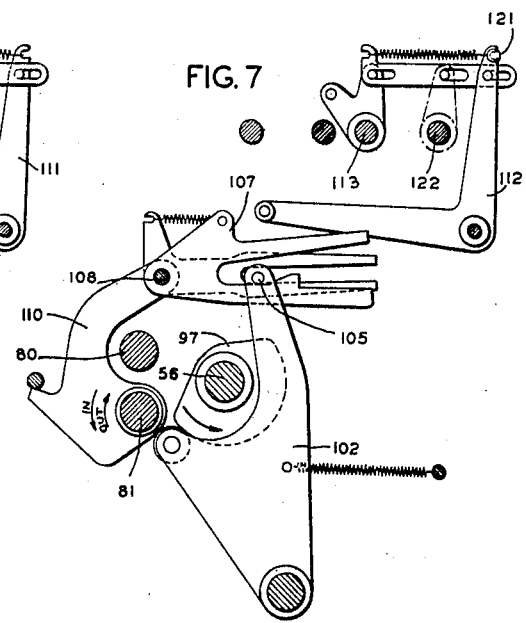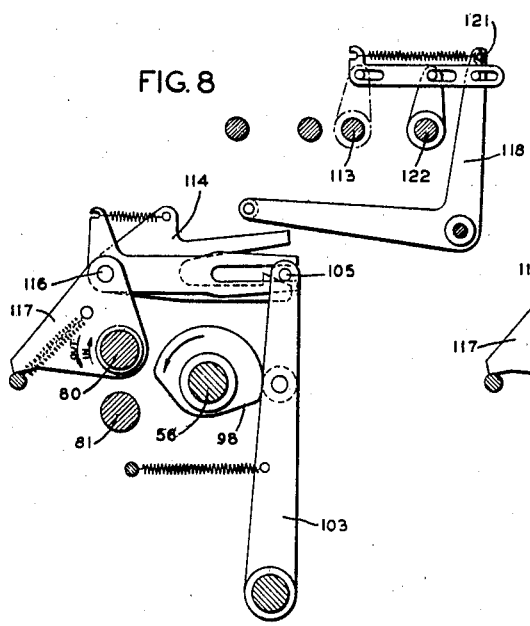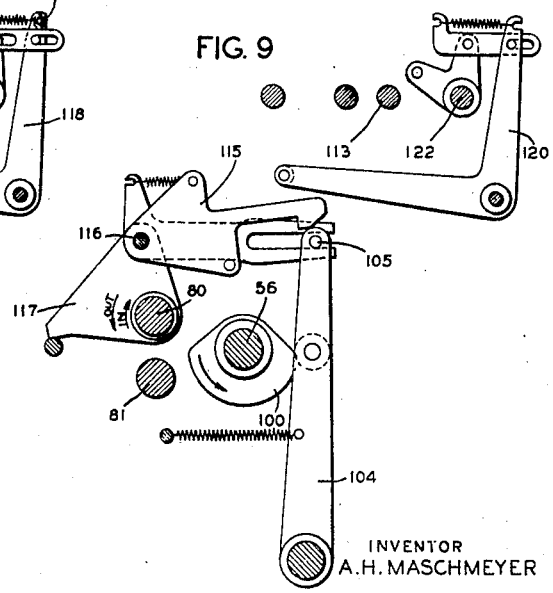

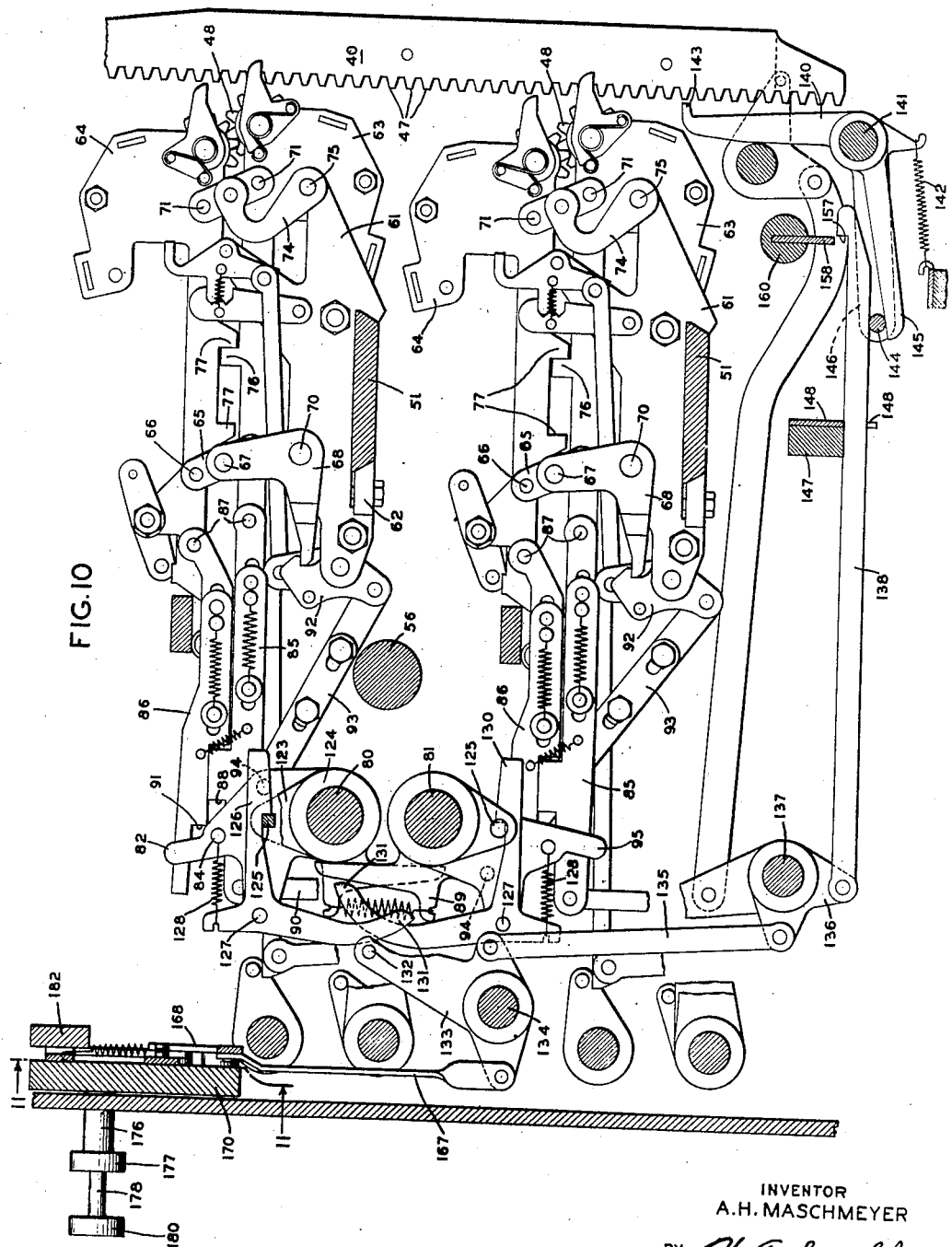

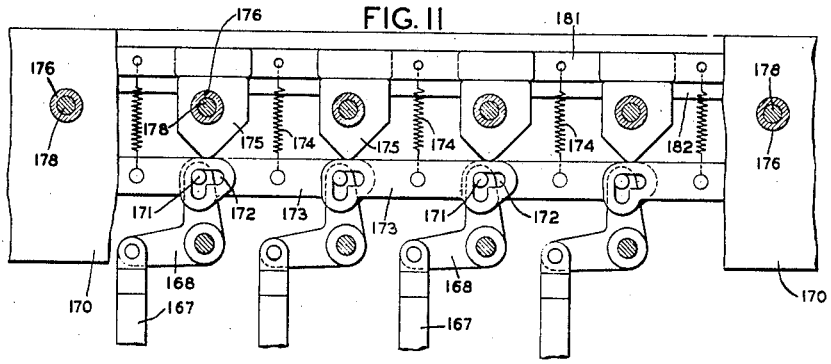
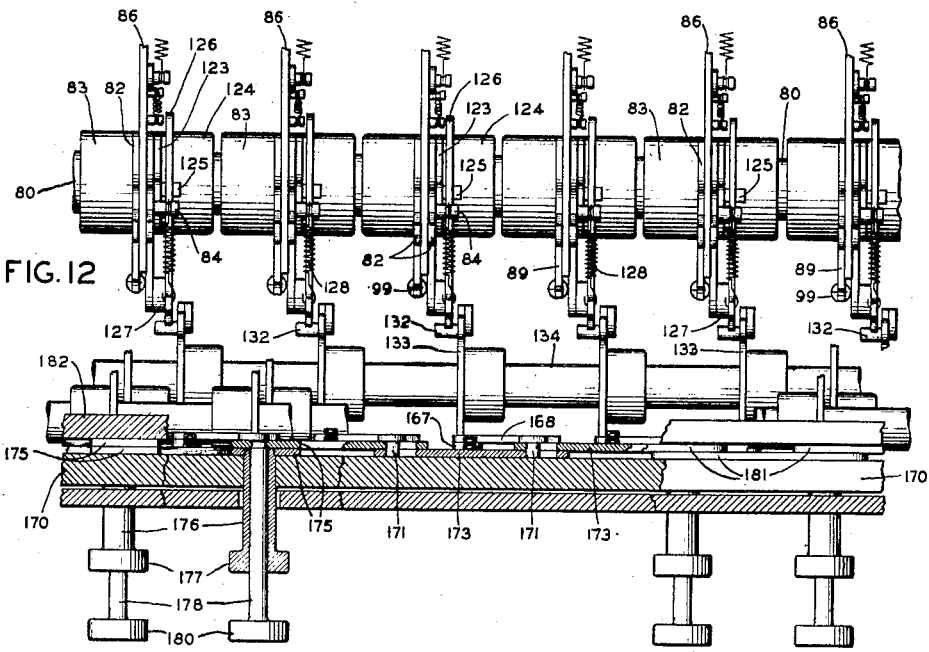
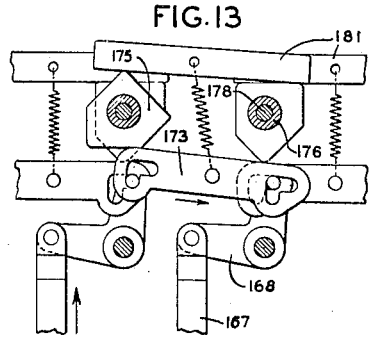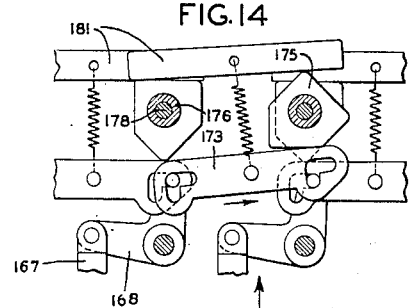

July 6, 1943.  A. H. MASCHMEYER  2,323,825
TABULATING MACHINE
Filed Aug. 9, 1940    10 Sheets-Sheet 8

INVENTOR
A. H. MASCHMEYER
BY
ATTORNEY

July 6, 1943.  A. H. MASCHMEYER  2,323,825
TABULATING MACHINE
Filed Aug. 9, 1940   10 Sheets-Sheet 9
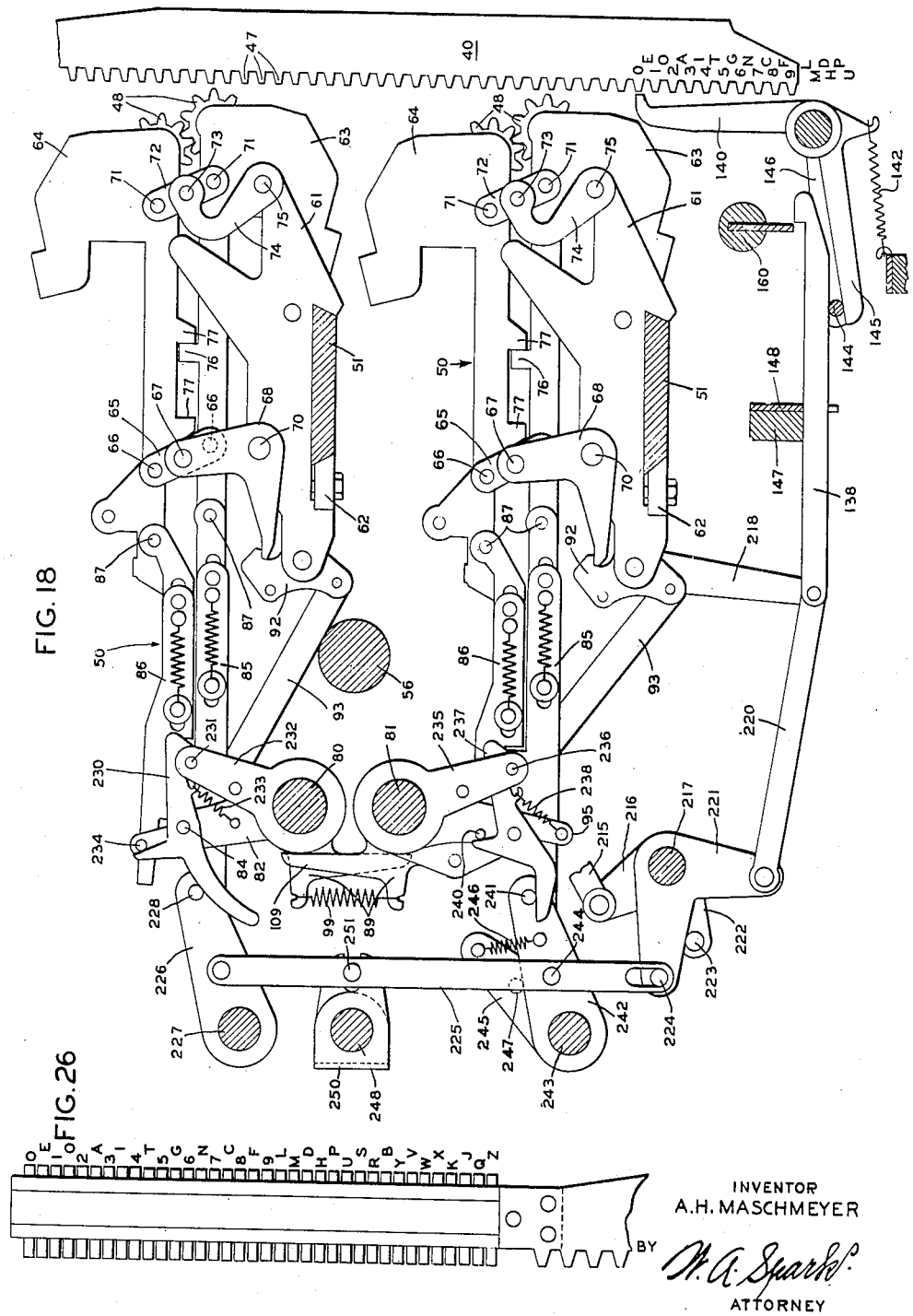
INVENTOR
A.H. MASCHMEYER
BY W. A. Sparks
ATTORNEY July 6, 1943.   A. H. MASCHMEYER   2,323,825
TABULATING MACHINE
Filed Aug. 9, 1940   10 Sheets-Sheet 10
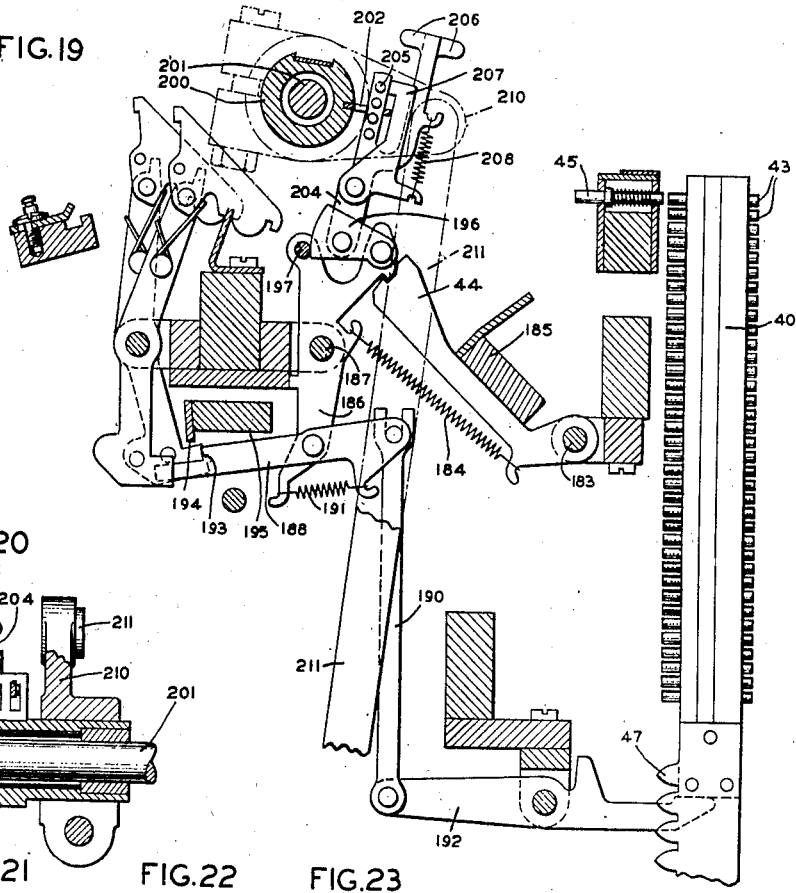
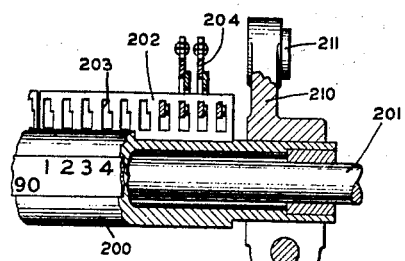
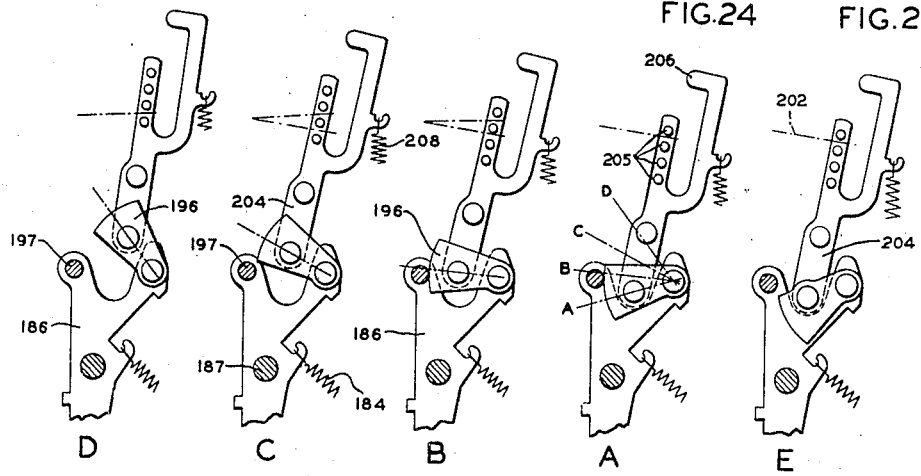
INVENTOR
A. H. MASCHMEYER
BY
ATTORNEY Patented July 6, 1943

2,323,825

UNITED STATES PATENT OFFICE 2,323,825

TABULATING MACHINE

August H. Maschmeyer, Port Jefferson Station, N. Y., assignor to Remington Rand Inc., Buffalo, N. Y., a corporation of Delaware Application August 9, 1940, Serial No. 351,952

7 Claims. (Cl. 235—61.9)

The invention relates primarily to tabulating machines controlled by records such as punched cards, though it may be applied to machines otherwise controlled.

These machines, used for statistical or accounting purposes include denominational differential members which serve sometimes as punch selectors, sometimes as the actuators for totalizers, sometimes as type carriers for the printing of either numbers or alphabetic or other characters, or of both. In the particular machine to which the invention is shown applied, the differential members carry each a full complement of ten numeric and twenty-six alphabetic characters, so that printing may be effected either of numbers or of words or of both; and these same members, or some of them, are also the actuators of totalizers.

The invention has for its object to improve the operation of these machines in certain respects which will be understood from the following description. According to the invention, certain functions of the machine are controlled and certain misoperations of the machine are prevented automatically in dependence on the mere ordinary settings of the differential members above referred to. In the illustrated instances of the invention means are provided to sense the set differential members or certain of them in such wise as to distinguish between numeric and alphabetic settings thereof, and means are provided whereby certain operations of the machine are controlled accordingly. In one instance, those of the differential members that serve as totalizer actuators are sensed and if any one of them is found set for printing an alphabetic character the totalizer or totalizers are prevented from engaging the actuators.

Where a totalizer is disabled in consequence of the sensing of an alphabetic setting, interconnecting devices may be provided, according to one feature of the invention, so as to disable one or more other totalizers, or, if desired, all of the totalizers in the machine. Thus, in a piece of work where a name and address are printed under card control at the head of a statement and amounts are printed in columns below the address, it may happen that the street number would come in the field of one of the totalizers and in that field an alphabetic setting would not occur. I this case a single type carrier set to an alphabetic position in another field would disable not only the totalizer in said other field but also the one where the street address occurred.

Means are also provided whereby these interconnecting devices are settable to active or to inactive condition, so that, in one set-up the disabling action on one totalizer would and in another set-up it would not be communicated to another totalizer.

In another illustrated instance, in case an alphabetic setting is detected, the set-up of the type hammer couplers which, in numeric printing, cause the printing of significant zeros, is changed. Thus, if text is to be printed in a field of the paper ordinarily used for printing numbers, these couplers are disabled so as, in that machine cycle, not to print unwanted zeros.

To the above and other ends, the invention consists of certain features of construction and combinations and arrangements of parts, all of which will be described herein and particularly pointed out in the claims. The principle of the invention may be embodied in mechanism differing considerably in detail from that illustrated, and the invention may have other applications than the two described.

In the accompanying drawings the invention is shown applied to a Powers punched card tabulating machine (hereinafter called the prior machine) of the sort described in the patent application of W. W. Lasker, Jr., executor of the will of W. W. Lasker, deceased, and John Mueller, filed November 13, 1937, S. N. 174,354, and also in the patent application of John Mueller, filed February 1, 1940, S. N. 316,739. In said drawings, Fig. 1 is a general front to rear vertical section through the middle of one form of the prior machine but with parts omitted;

Figure 2:
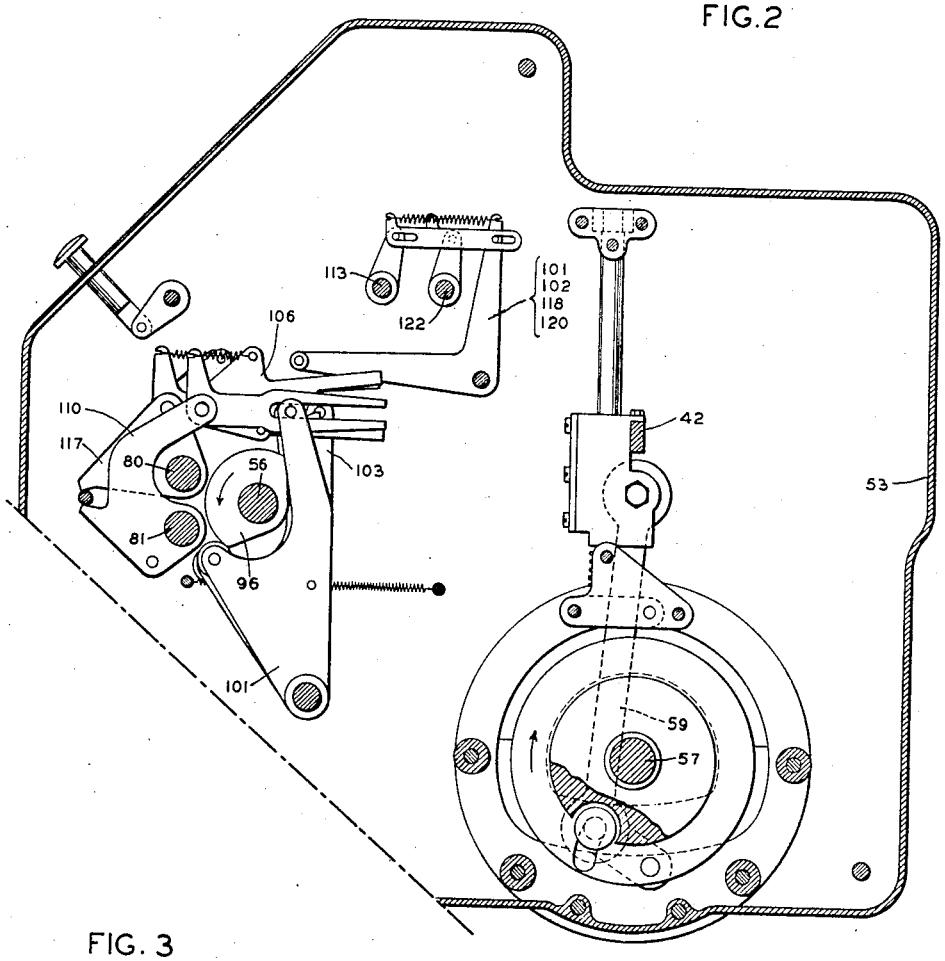
Fig. 2 is a vertical section on the line 2 of Fig. 5 and looking in the direction of the arrow at said line, and with parts omitted.
Figure 15:
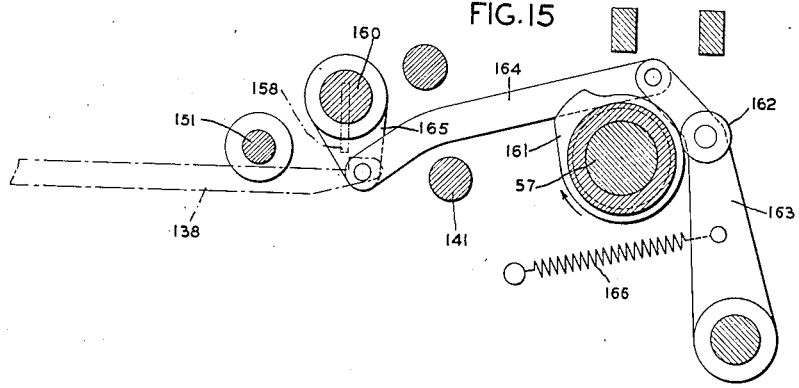
Figure 16:
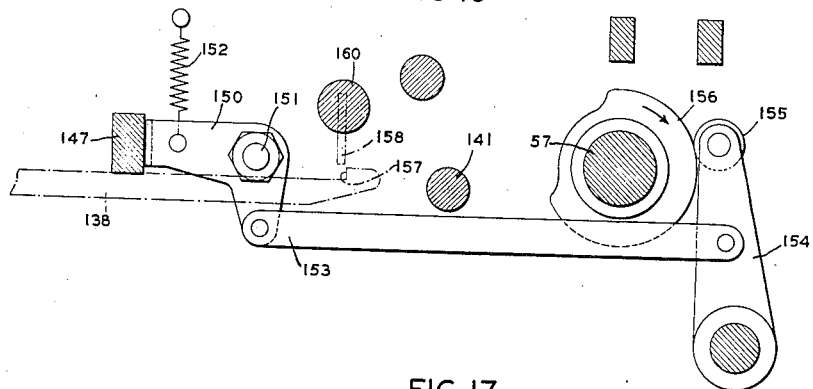
Figure 17:
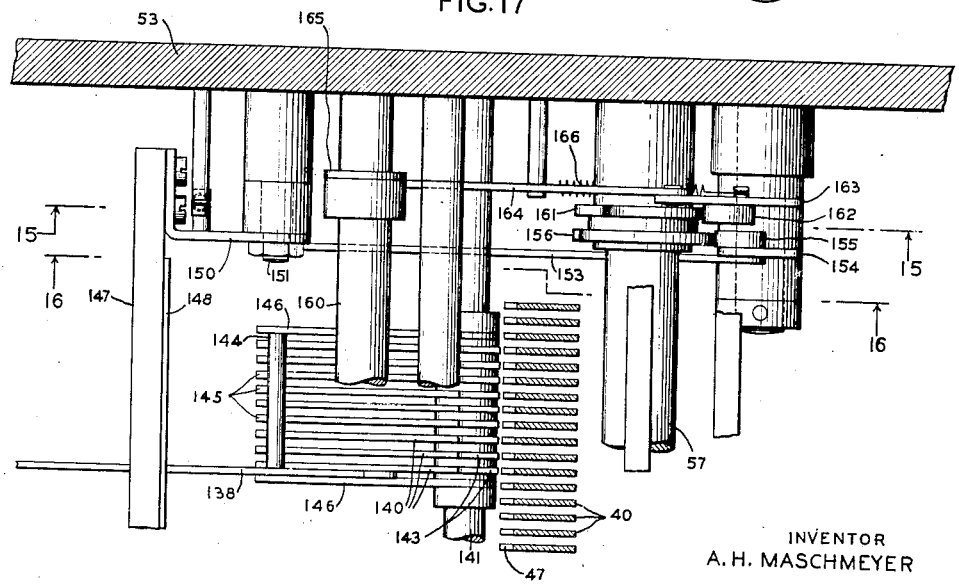

Figs. 6, 7, 8, and 9 are views similar to portions of Fig. 2 and showing separately the four cams and cooperating devices for moving the totalizers into and out of engagement with the actuators;

Fig. 10 is a right-hand side elevation, partly in section, showing two totalizers and associated devices and having the present invention applied thereto;

Fig. 11 is a fragmentary front view of parts of the invention, in section on the line 11 of Fig. 10;

Fig. 12 is a fragmentary top plan view, partly in section;

Figs. 13 and 14 are views similar to Fig. 11 but showing different settings of the parts;

Figs. 15 and 16 illustrate the main operating parts of the invention, and they are sections, respectively, on the lines 15—15 and 16—16 of Fig. 17;

Fig. 17 is a fragmentary plan view, partly in section, showing the sensing mechanism and the main operating mechanism of the invention;

Fig. 18 is a right-hand side elevation of two totalizers and associated devices and having the present invention applied thereto in a modified form;

Fig. 19 is a section, viewed from the right, of one form of printing mechanism having the present invention applied thereto;

Fig. 20 is a fragmentary top view, partly in section of a portion of Fig. 19;

Figs. 21-24 are fragmentary views of the zero coupling mechanism which is shown in different positions in the different views;

Fig. 25 is a similar view of a slightly modified zero coupler; and

Fig. 26 is a fragmentary view of the upper end of one of the type carriers.

Figure 1:
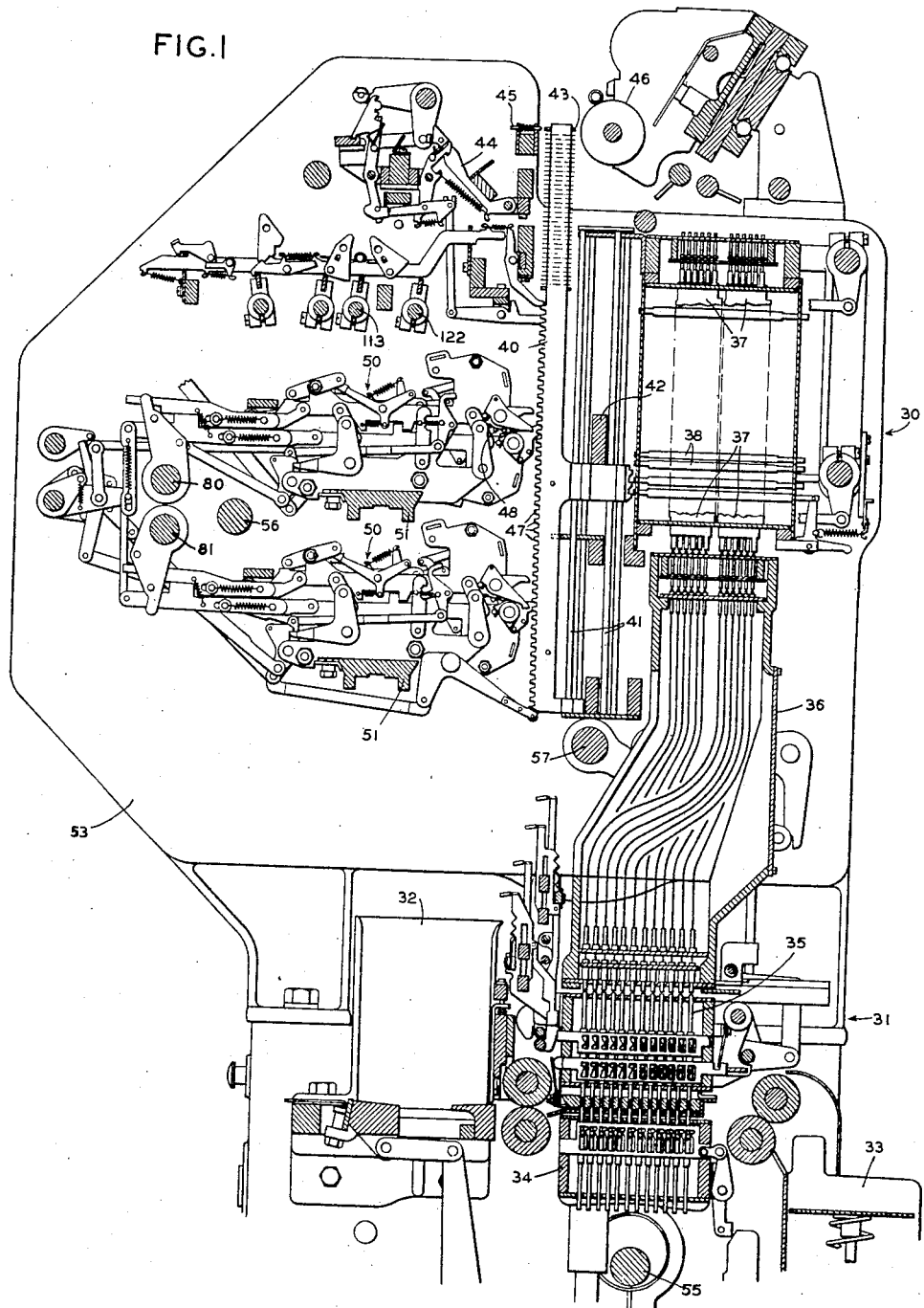

The machine (Fig. 1) comprises a head section 30, mounted on a base section 31, the latter being substantially like the base section of the Powers tabulators in common use and which, with some modification to adapt it for sensing ninety-column cards, is substantially as described in the patent to W. W. Lasker, No. 2,044,119, dated June 16, 1936. It has the usual hopper 32 from which the cards are fed into the sensing mechanism and thence to the receptacle 33. Sensing pins in the reciprocating pin box 34, elevate set pins 35, which, through Bowden wires in the translator 36, selectively displace code bars 37, which control stops 38 which, in turn, arrest the differential members, consisting of slide bars 40. Certain of the guide rods 41, on which the bars 40 slide, have coiled about them compression springs impelling the bars upward, said bars being returned by a restoring bar 42. The bars 40 are combined type carriers and totalizer actuators. Each one carries thirty-six types 43, adapted to be driven by a type hammer 44 and firing pin 45 against a platen 46 to print the alphabet and the numerals.

The bars 40 have rack teeth 47 for actuating the register wheels 48 of totalizers 50, mounted on cross bars 51. In this machine there are two of these cross bars, one above the other, and totalizers may be mounted on these bars in two tiers and located in any desired positions across the machine.

There is a long, continuous series of the bars 40, all of which can be used to print text, consisting of words and numbers, and any desired selection of which can also be used to actuate totalizers which may be assembled anywhere along the bars 51. An unusually full complement of totalizers is indicated in dot-dash lines in Fig. 5. Thus, the same type carriers 40 may be used in some cycles to print and add numbers and to print totals, and in other cycles to print letters.

Figure 4:
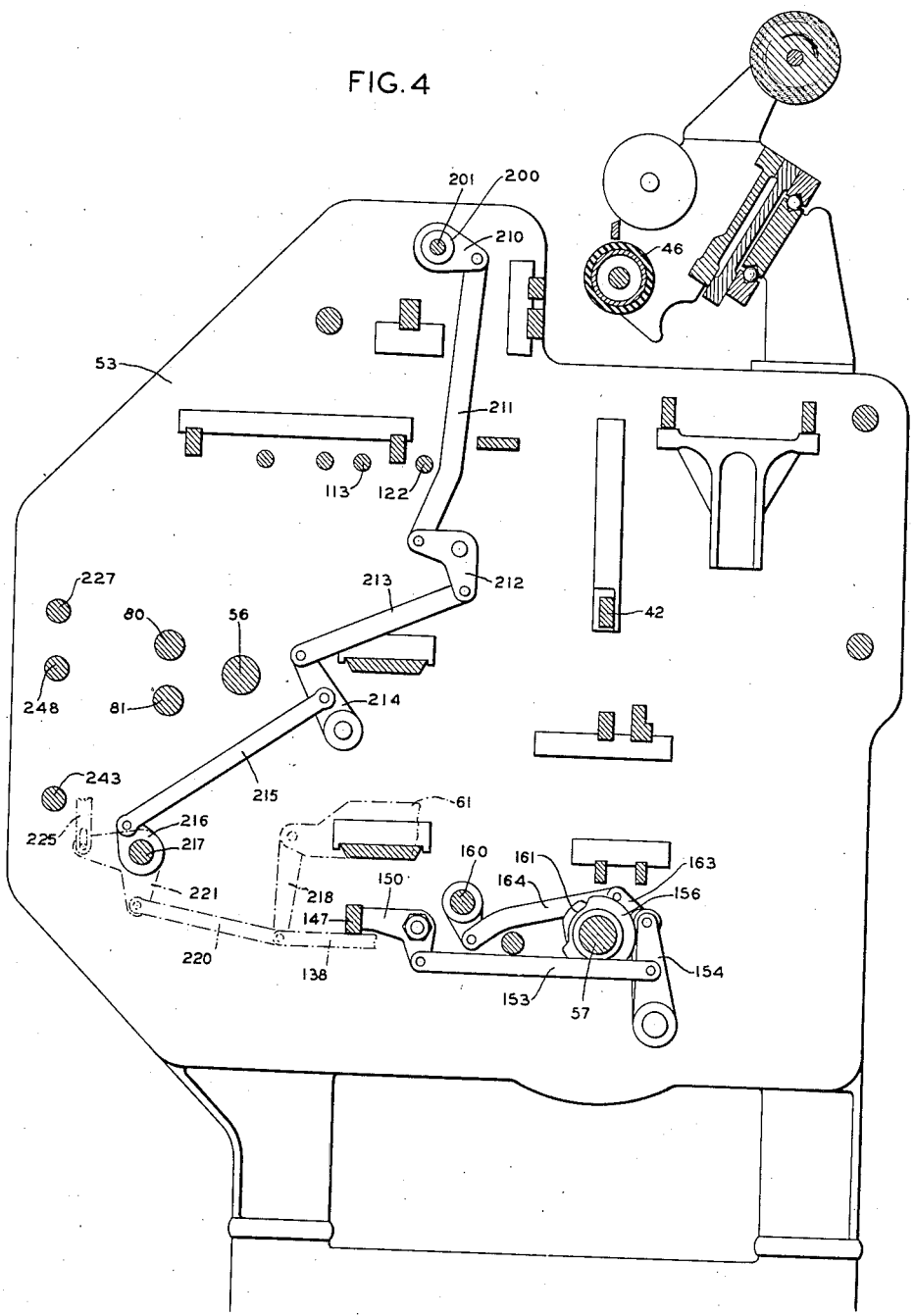
Fig. 4 is a vertical section on the line 4—4 of Fig. 5 and looking in the direction of the arrows at said line.
Figure 5:
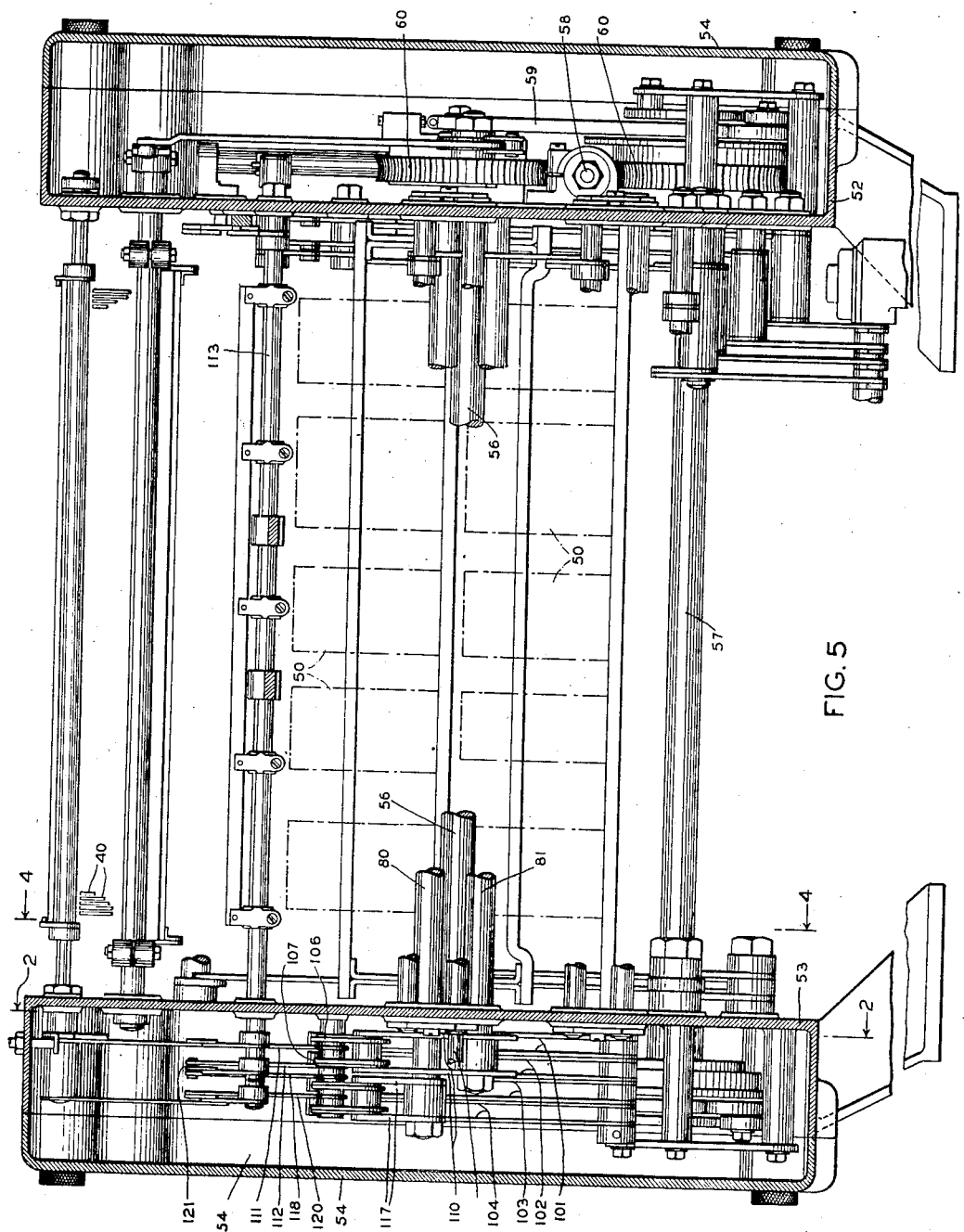
Fig. 5 is a general front view of the head section of the machine, partly in section and with parts broken away or omitted.

The framing of the head section 30, comprises various cross bars and rods connecting right and left-hand vertical box-like frames 52 and 53, each shown in Fig. 5 provided with a removable cover 54. Fig. 4 is a vertical section taken about on the line 4—4 and Fig. 2 is a section on line 2—2 of Fig. 5, and looking leftward, the latter figure showing the flanges of frame 53 in section. The motor driven drive mechanism includes a base main shaft 55 (Fig. 1) and upper front and lower rear drive shafts 56 and 57 in the head, all of said shafts making one rotation for each machine cycle. The shafts 56 and 57 (Fig. 5) have worm wheels 60 driven in opposite directions by a worm shaft 58 suitably geared to the shaft 55 in the base. The restoring bar 42 is reciprocated by pitmans 59 from cranks on the ends of the shaft 57, as shown in Fig. 2.

The totalizers may be of any suitable construction, as far as the present invention is concerned. Those shown are of a novel design, which is fully described and claimed in the Lasker and Mueller application. Only so much of them is described herein as is necessary to an understanding of the mechanism for moving them into and out of engagement with the racks 40. The stationary frame of the totalizer comprises two side plates 61 (Fig. 18) connected together by suitable cross members and fastened on the bar 51 by a dovetail arrangement including a clamping member 62. The register wheels 48 are in two sets, the lower adding wheels and the upper subtracting wheels being carried in two separate auxiliary frames 63 and 64. Said frames near their front ends are each pivoted at 66 to a transverse rocking member 65, which, in turn, is pivoted at 67, midway between the pivots 66, to levers 68, one on each side of the totalizers. Said levers 68 are fast on a rock shaft 70, journaled in the fixed side plates 61. On each side of the totalizer the side plates of the frames 63 and 64 are pivoted at 71 to a link 72, which at 73 is pivoted to a link 74, pivoted at 75 to the fixed plate 61. The levers 68 and the links 74 are parallel and are so disposed that, by rocking them clockwise in Fig. 18, both auxiliary frames 63 and 64 will be moved to the right, bringing the lower register wheels 48 into mesh with the racks. The member 65 and the links 72 are also parallel and are so disposed that by swinging them clockwise about their pivots 67 and 73, the upper register wheels will be moved rearward and the lower wheels frontward until the upper wheels lie nearer than the lower ones to the racks. If then, members 68 and 74 be swung clockwise, the upper wheels will be moved into mesh for subtraction. The relative motion of the frames 63 and 64 is limited by a lug 76 on the former playing between two lugs 77 on the latter. The totalizer is drawn out of engagement by a spring acting on the structure 68, 70.

According to one feature of the present invention, means are provided for causing numbers to be entered into a totalizer by certain of the actuating members 40, provided said members are all set to numeric printing positions, and not to alphabetic or non-numeric positions. In the illustrated instance, this causing means comprises power operated shafts, 80 for the upper totalizers and 81 for the lower totalizers, and connections whereby a clockwise rocking of the former and a counter-clockwise rocking of the latter, moves the totalizers into engagement with said actuating members; and means are provided whereby the operation and non-operation of said causing means is determined automatically by the settings of said members. In case any one of the members 40 in question is set in an alphabetic position, the connections from the shafts 80 and 81 to the totalizers, are automatically disabled. The shaft 80 is shown in plan in Fig. 12. Said shaft has arms 82 mounted thereon, one in front of each upper totalizer. In the prior applications these arms are fast on the shaft, but according to the present invention they are loose thereon, and normally coupled to rock therewith and they may be individually uncoupled when required to prevent engagement of the totalizer. Each arm 82 consists of two plates fast on the same hub 83 (Fig. 12) and connected by a pin 84. Lying between the two plates of the arm 82 are a lower link 85 and upper link 86 pivoted at 87 to the right-hand side plates of the auxiliary frames 63 and 64 respectively. These links are so disposed that if the shaft 80 be rocked clockwise in Figs. 10 and 18, the pin 84 will act on a shoulder 88 on the lower link 85 and push the totalizer into engagement. If the two links 85 and 86 be first swung downward at their forward ends, as they may be by a link 90, a shoulder 91 of the upper link 86 will be acted on by the pin 84, and the resultant thrust will come on the upper frame 64, and will first rock the member 65 about its center 67, thus advancing the upper totalizer wheels 48 and withdrawing the lower wheels, until this relative motion is arrested by the lug 76 engaging the forward lug 77. Continued motion of the arm 82 and pin 84 will then move the upper or subtract wheels 48 into the racks.

A latch 92 normally locks the lever 68 against rocking, so as to insure that, when changing from add to subtract or vice versa, the totalizer will not move back bodily before the relative shifting of the two frames 63 and 64 has been completed. This latch is released at the proper moment by a link 93 actuated by a pin 94 on the arm 82, said pin having just enough lost motion in a slot in said link to allow of the relative shift before releasing the lever 68.

The lower totalizers are controlled by the shaft 81 in the same way as above described, except that the arms 95, corresponding to the arms 82, hang down from the shaft and act by rocking counter-clockwise. The arms 82 and 95 may be restored to normal position in any suitable way. As best shown in Fig. 18, each of them may be made with a branch 89, said branches connected by a spring 99; and each arm has a branch 109 which is arrested in normal position by the hub of the other arm.

The totalizer control shafts 80 and 81 are actuated by mechanism shown in Figs. 2, 5, 6, 7, 8, and 9, said mechanism being in the box-like left-hand frame member 53, outside of the web of said member. The front drive shaft 56 has on its projecting end four cams 96, 97, 98, and 100, shown respectively in Figs. 6, 7, 8, and 9. These cams yield respectively, total from upper totalizers, add on upper totalizers, add on lower totalizers, and total from lower totalizers. These cams actuate respectively four follower levers 101, 102, 103, and 104, the follower rollers being so disposed that the cams positively rock levers 101 and 102 toward the front of the machine and levers 103 and 104 toward the rear, the levers being returned by springs. Each of these levers is made in two layers as shown in front view in Fig. 5, the follower rollers being journaled between the layers, which are joined at their upper ends by pins or posts 105. The pin 105 of the lever 101 is adapted to be engaged by a pawl-like push link 106, which, however, is normally held by a spring out of engagement. The pin 105 of the lever 102 is adapted to be engaged by a pawl-like push link 107 which is normally held engaged by a spring. In the drawings all of these parts are shown after a grand total operation, when the link 107 is left temporarily unlatched. If both links 107 and 106 be depressed, the former will be moved out of and the latter into engagement, thus setting the mechanism for a total from the upper totalizers. The links or hooks 106 and 107 are both pivoted on a pin 108 joining the two parallel plates which, together, constitute an arm 110 fast on the lower actuating rock shaft 81 (see Fig. 5). The links 106 and 107 may be depressed by any suitable means, according to the results desired. They are here shown controlled respectively by two bell-cranks 111 and 112, both actuated by a certain total shaft 113.

The pin 105 of the lever 103 may actuate a pull link 114, which is normally held up in active position by a spring but may be depressed out of engagement. The pin 105 of the lever 104 is adapted to actuate a pull link 115 which is normally held out of engagement by a spring, but may be depressed into engagement. Both links or hooks 114 and 115, are pivoted on the same post 116 joining the two parallel plates of an arm 117 fast on the upper rock shaft 80. Said links may be controlled in various ways. As here shown the link 114 is controlled by a bell-crank 118 and the link 115 by a bell-crank 120. In the specific instance illustrated, the bell-cranks 112 and 118 are connected together by a post 121 so that they move together and they are so moved by the total shaft 113 and also by a grand total shaft 122. The latter also operates the bell-crank 120. When, therefore, the total shaft 113 is rocked, bell-cranks 111, 112 and 118 are all actuated, the first two setting the mechanism for a total from the lower totalizers and the last setting the upper totalizers to non-add. When the grand total shaft 122 is rocked, both bell-cranks 112 and 118 are actuated to disable both add cams, and the bell-crank 120 is also actuated to set the upper totalizers for a total taking cycle.

In order to enable any of the arms 82 to be operatively connected with and disconnected from the upper rock shaft 80 so as, in the latter case, to prevent the corresponding totalizer from being engaged with the racks, according to the present invention, an arm 123 (Figs. 10 and 12) stands beside each arm 82 and has its hub 124 fast on the shaft, and said arm carries a pin 125 adapted to be engaged by a hook 126 pivoted at 127 to the arm 82 and moved into coupling position by a spring 128. If the coupling hook 126 be released from the pin 125, then, when the shaft 80 is rocked, the arm 82 will not rock with it and the upper totalizers will not be engaged with the racks. The arrangement on the lower shaft 81 is substantially like that just described, except that the parts are reversed up and down, and the hook 130 is released by clockwise instead of counter-clockwise rocking.

The means for releasing the coupling hooks 126 and 130 may be varied in detail. In Fig. 10 said hooks are made respectively with depending and upstanding arms 131, both adapted to be operated by a pin 132 on a bell-crank 133 loosely pivoted on a transverse pivot rod 134. The arms 131 are curved so as not to get out of register with the pin 132 when the shafts 80 and 81 are rocked. The lever 133 is rocked clockwise by a link 135 pivoted thereto and to a bell-crank 136 loosely pivoted on a transverse pivot rod 137.

The bell-crank 136 is operated on occasion by a link 138, which, by means now to be described, is pulled automatically whenever any one of the type bars 40 associated with one of the totalizers 50 is set to print a character other than a numeral. This may be determined by sensing some parts that are differentially set in harmony with the types, and in the present instance it is the bars 40 themselves that are sensed.

The means for sensing the type carriers 40, to determine whether they are set to a numeric or an alphabetic character, comprises a set of feelers 140 (Figs. 10 and 17) each loosely pivoted on a transverse pivot rod 141 and urged by its individual spring 142 to swing clockwise in Fig. 10 to press a sensing tooth 143 against the forward edge of the associate type carrier 40. There is a set of feelers 140 of a number corresponding to the number of denominations of the totalizers 50, nine such feelers being shown in Fig. 17. Also, there is a set of feelers for each field of the machine defined by totalizers. As many sets or units of feelers as required may be placed on the shaft 141 and located as required to correspond with the lateral positions of the totalizers; and bell-cranks 136 and 133 and connections may be located correspondingly on the rods 137 and 134.

The feelers 140 are controlled by a bail bar 144 which overlies horizontal arms 145 of the several feelers. This bar is supported by arms 146 whose hubs are loosely pivoted on the shaft 141. The hook link 138 lies on top of the bar 144 and underneath a long bail bar 147 carrying a comb 148 for guiding said link and the corresponding links of any other units the machine may contain. The arms 150 for the bail bar 147 (Figs. 16 and 17) are pivoted on studs 151 fixed to the end frames 52 and 53, and are drawn upward by springs 152. The left-hand arm 150 is one arm of a bell-crank whose vertical arm is connected by a link 153 with a lever 154 carrying a follower roller 155 which is pressed by its associated spring 152 against a cam 156 on the rear head drive shaft 57. Said cam has a concentric high dwell connected by inclines with a concentric low dwell. When the follower 155 is on the high dwell, it holds the bail bar 147 down in the position shown in Figs. 16 and 10, and, by pressing downward on the hook link 138, holds down the bail bar 144 which, in turn, holds all of the feelers 140 out of contact with the type carriers 40. When the low part of the cam 156 registers with the follower 155, the springs 152 raise the bar 147, leaving the bail bar 144 of the sensing unit free to be raised by the spring 142 acting through the arm 145 of any feeler that finds a notch in its bar 40.

The type carriers 40 are each notched in such a way that the sensing tooth 143 will be obstructed whenever a numeral type is in printing position and will be free to yield to its spring 142 whenever any other character is in position. The prior machine happens to be so constructed that some of the regular rack teeth 47 answer the purpose. The numeral types alternate with alphabet types, and the spacing of the teeth 47 is just double that of the types, the zero type being the topmost one and normally at the printing point. The tooth 143 normally registers with the tenth tooth 47 from the bottom of the rack, and is obstructed whenever the zero or any of the other ten digits is at printing position. When any of the interspersed letter types is in printing position, said tooth enters one of the regular interdental spaces of the rack, the feeler is rocked and the bar 144 is elevated. When the type carrier stands at "9," said tooth is obstructed by the bottommost rack tooth. From there on, all types are alphabetic, and to print them the bottom of the rack rises above the tooth 143 and the feeler is operated accordingly. In order to provide for this mode of operation without interference, the rack has been extended downward lower than in the prior applications to the extent of four teeth.

When one of the feelers 140 senses an alphabetic position of the type carrier and raises the bar 144, said bar lifts the hook link 138 to bring its shoulder 157 into the path of movement of a blade 158 set longitudinally into a rock shaft 160. The rocking of this shaft pulls the link, in case the latter has been raised, and releases the coupling hooks 126 and 130 in the manner hereinbefore described. This shaft is rocked by a cam 161 (Figs. 15 and 17) on the drive shaft 57, acting on a follower roller 162 on a lever 163 which is connected by a link 164 with an arm 165 fast on the shaft 160, the parts being restored to normal by a spring 166 acting on the lever 163. The cam 161 has a long low dwell and a shorter high dwell connected by inclines, and it is timed to "pull" the shaft 160 a moment after the cam 156 has permitted the feelers to act. The cam 156 acts before the type bar restoring bar 42 reaches the top of its stroke, this being permissible because the "9" type is at about the middle of the bar and as it passes the printing point the bottom of the rack passes above the sensing tooth 143 and there can be no further interference.

Figure 3:
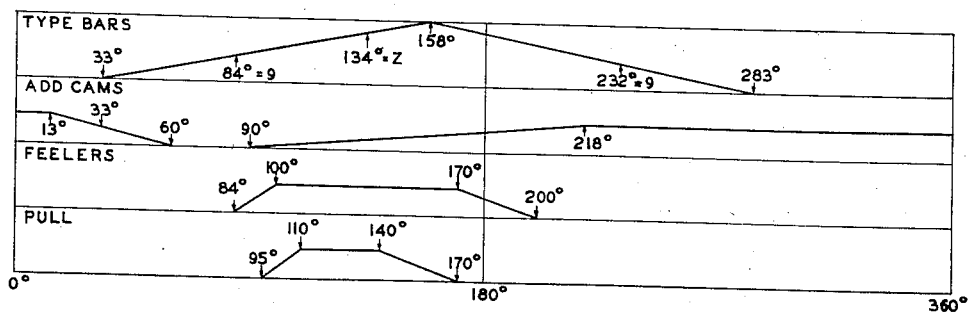
Fig. 3 is a time chart.

The timing of the mechanism would, of course, vary in different embodiments depending on the machine to which the invention was applied. In the specific instance illustrated, it is about as follows (Fig. 3): The add cams 97 and 98 (Figs. 7 and 8) begin to withdraw the totalizers from the racks at 13° and have the the wheels clear of the racks at 33°. At this point the type carriers 40 begin to rise and they reach the "9" position at 84°. At that point the cam 156 (Fig. 16) permits the feelers to start their sensing movement, the follower 155 reaching the low dwell at 100°. At 95° the cam 161 (Fig. 15) begins to "pull" the shaft 160, the follower reaching the high dwell at 110°. Meanwhile, the add cams 97 and 98 have started at 90° to rock the shafts 80 and 81, completing such rocking at 218°. The totalizers do not begin to move into engagement until the latter part of this motion, viz., until the pin 84 reaches the position of the shoulder 86 in Fig. 10. If any feeler senses an alphabetic position the coupling hooks 126 and 130 will have been released somewhere between 95° and 110°, and the totalizer will not be engaged. The shaft 160 (Fig. 15) begins its return motion at 140°, by which time the pins 125 (Fig. 10) are well beyond the shoulders of the coupling hooks, and such return is completed at 170°. At that point the bar 147 (Fig. 16) begins its return motion which is completed at 200°, and the feelers are then fully restored. The type bars on their return movement do not reach the "9" position until 232°.

As thus far described, the mechanism is individual to each computing unit of the machine, and the machine may contain one or several such units, and a separate mechanism may be applied to each unit, except that some of the members, such as the bail 147 and rock shaft 60 are common to all units. Only certain of the type bars are sensed, and, if some type bar is set to an alphabetic position, only the associate totalizer unit is disabled. This is sufficient in some instances, for example, where the only purpose is to prevent injury to the mechanism by a tooth of a totalizer wheel being pressed against the end of a rack tooth instead of into an interdental space. It is, however, sometimes desirable to disable two or more pairs of totalizers, or even to disable all of the totalizers in the machine, if a single one of the sensed type carriers is set to an alphabetic position. Interconnection between different fields of the machine may be effected in various ways, some of which will be described.

One form of interconnecting mechanism is shown in Figs. 10–14, inclusive. Fig. 12 shows in plan view the disabling mechanism according to the present invention applied to a series of totalizers arranged side by side. Only the push bar 86 of each totalizer is shown, but this will serve for a schematic representation of a series of totalizers. In practice, the totalizers are not always spaced as close together nor as uniformly as here represented. The interconnecting mechanism includes links 167, one pivoted at its lower end to a horizontal arm of each disabling lever 133 and pivoted at its upper end to a bell-crank 168, the several such bell-cranks being pivoted to a transverse frame bar 170. Each bell-crank has a pin 171 projecting from its upstanding arm into inverted L-shaped slots 172 in two floating links 173, whose ends overlap as shown in Fig. 12. There is a series of these links, each extending from one bell-crank 168 to the next, the links, when connected up as presently to be described, constituting a sort of chain. Each link is drawn up at its middle by a spring 174, which tends to raise the link until the bottom of the vertical arms of the slots 172 embrace the pins 171. This action of the spring is controlled by two cam discs 175, one at each end of the link. As there are two links for each bell-crank 168, two of these discs are mounted, one behind the other, above each bell-crank. The forward one is fast on the inner end of a sleeve 176 journaled in the bar 170 and projecting frontward therefrom into an accessible position and having at its front end a knurled head 177 by which it may be manually turned. The rear disc is fast on the inner end of a shaft 178 passing through the sleeve 176 and furnished with a knurled head 180. This rear disc overlies and controls the rear link 173 and the forward disc overlies and controls the forward link. Each disc 175 may be turned to one position, shown in Fig. 11, where a high part of it depresses one end of the link until the horizontal part of the slot 172 registers with the pin 171, or to another position shown at the left in Fig. 13, and at the right in Fig. 14, where the link 173 is permitted to rise, causing the vertical branch of the slot to embrace the pin. The springs 174 are shown anchored to bars 181 resting on the tops of the cams 175 which are so shaped as to lift said bars when their lower edges permit the links 173 to rise. A cross bar 182 lies behind the parts 175 and 181 to prevent rearward displacement thereof.

The mode of operation of the interconnecting mechanism will be apparent from Figs. 11, 13, and 14. With the parts as shown in Fig. 11, said mechanism is inactive. When one of the bell-cranks 168 is rocked, its pin 171 moves idly in the slots 172 and no effect is transmitted to fields of the machine other than the one in which an alphabetic position of one or more type carriers was sensed. In Fig. 13, the left-hand one of the two units shown has the rear link 173 extending leftward, set inactive, and the rightward front link set active. The bell-crank 168 has been rocked in consequence of the detection of an alphabetic position, and its motion has not been transmitted to the unit at the left but has been transmitted to the one at the right. The latter has both of its links set inactive, and the movement was, therefore, not transmitted to the next unit to the right of this one. Had the front cam 175 of this unit been set active, however, the movement would have been so transmitted. In Fig. 14, the two units are set oppositely to those just described. Here a movement originating in the right-hand unit shown, has been transmitted toward the left and not toward the right. It will be apparent that when one end of any link is set inactive, the associate pin 171 and bell-crank 168 cannot transmit their motion to said link but can be rocked by it if the link is operated at its other end. If at any unit both links are set active (upper), that unit can transmit its movement both to the right and to the left. If a series of links 173 be set active, the movement originating in one unit will be transmitted to several units. It will be perceived that the arrangement shown may be set in a variety of combinations to give desired results. It will also be apparent that many obvious modifications of this arrangement may be provided to suit the requirements of different users. For example, one of the links 173 may be made long enough to span over and skip one or more fields and affect another and more distant unit.

The form of the invention shown in Figs. 4 and 18–25 includes means whereby, when an alphabetic position is sensed, the automatic zero printing couplers used in the printing mechanism in computing and other numerical columns, are rendered inactive to adapt the mechanism for printing text; and, if desired, the mechanism may be manually pre-set so as to render active zero couplers which are normally inactive. Other variations may also be made so that the set-up of these couplers may be changed in whole or only in part, as will be explained.

Figs. 19–25 show a form of zero-coupling mechanism described and claimed in the Mueller application S. N. 316,739. Each type hammer 44 is pivoted at 183 to a fixed frame bar and is impelled by a spring 184 and restored by a bail 185 having a timed oscillation. The hammer 44 is restrained by a latch lever 186 having a fixed pivot 187 and influenced by the spring 184. A trip link 188 pivoted to the latch lever 186 is held in inactive position by a link 190 against the tension of a spring 191. Said link is pivoted to a control lever 192 normally held clockwise by a ledge on the associate type carrier 40. When the latter rises, the spring 191 swings the trip link 188 until a shoulder 193 thereon comes into the path of a flange 194 on a print bar 195 which, at the proper moment, is moved slightly rearward and back. The construction is such that those latches only whose associate type bars have been set to a printing position above normal, are tripped to release the hammers by the action of the trip links 188. The zero coupling mechanism may be set wherever desired to transmit the releasing movement of one latch to the next latch to the right of it. This mechanism comprises a sector shaped coupler 196 pivoted to the right side of each latch 186 and a pin or lug 197 projecting leftward from each latch so that, when a coupler is in the position shown in Fig. 19, the pin 197 of the next latch to the right, lies in its path and will be operated by it. Each coupler may occupy any one of the four positions shown diagrammatically by the broken lines A, B, C, and D in Fig. 24. Positions A (Fig. 24) and B (Fig. 23) are active positions in which the coupler can operate the pin 197 of the next latch, and positions C (Fig. 22) and D (Fig. 21) are inactive, the coupler standing above the pin. Means are provided whereby the coupler may be pre-set by hand to any one of positions A, B, or C; and means are also provided whereby on occasion, all of the couplers may be swung upward to a limited extent. In computing columns, the couplers would usually be set in active position B, and when alpha is to be printed they are raised to inactive position C. In case there is some field in which numbers are to be printed whether or not an alphabetic card is sensed, the couplers would be set in active position A, and, when the alphabet card was sensed would be raised to position B where they are still active. In fields normally reserved for alpha printing, the couples would be set to inactive position C from which, when alpha cards are sensed, they would be raised temporarily to inactive position D. When a numeric card is sensed, the couplers all return to their several normal positions determined by their pre-setting. A coupler may be arranged as in Fig. 25, where it is normally in inactive position below the pin 197, but will be raised into active position when an alpha card is sensed.

The means for simultaneously swinging all of the couplers 196 out of their pre-set normal positions, comprises a rock sleeve 200 surrounding and journaled on a certain non-print shaft 201 which is a part of the Lasker and Mueller construction. A sheet metal flange 202 set into said sleeve has a series of openings 203, one for each denominational position of the printing mechanism (Fig. 20). To each coupler 196 there is pivoted a control link 204 which extends upwards through one of the openings 203. Said link has four lugs 205 projecting from one face thereof. The opening 203 is wide enough at its front end to allow of passage of said lugs, but is narrowed at its rear end. To pre-set any coupler, its control link is swung by its handle 206 frontward into the wide part of the opening, set up or down to the desired one of the positions A, B, C, and then swung rearward into the narrow part of the slot where one of the lugs 205 engages above and another below the flange 202 and constitute a sort of pivotal connection. A guide piece 207 is pivoted to the link 204 and is connected with it by a spring 208 which presses a lug at the upper end of the guide against the edge of the link, leaving a guide slot between the two. When the link is pulled into the front of the opening 203, the guide piece 207 is pressed against the edge of the flange and the spring is stretched. The spring thus holds the link normally in the rear part of the opening. It will be perceived that a counter-clockwise (Fig. 19) rocking of the sleeve 200 will simultaneously lift all of the couplers 196 with the effects above described. In the Mueller application, this sleeve is rocked under the control of a special hole in an alpha card.

According to the present invention the sleeve 200 which changes the settings of the zero couplers is shifted under the control of the alphabet sensing mechanism hereinbefore described, so that no special hole in an alphabet card is required. At its left-hand end said sleeve carries an arm 210 which is connected by a linkage consisting of a link 211, bell-crank 212 (Fig. 4), link 213, lever 214 and link 215, with an arm 216 fast on a transverse rock shaft 217 so that a counter-clockwise rocking of shaft 216 will cause the required counter-clockwise rocking of the sleeve 200. The levers 212 and 214 are pivoted on studs on the left-hand frame 53 and the shaft 217 is journaled in the two main frame pieces 53 and 52.

In this instance the link 138 from each sensing unit is pivoted to a guide link 218 (Figs. 4 and 18) to which is pivoted a link 220 which is pivoted to a bell-crank 221 loose on the shaft 217. Beside said bell-crank is an arm 222 fast on the shaft and having a pin 223 lying under an arm of the bell-crank so that said shaft will be rocked and the above described mechanism operated whenever the hook line 138 of any sensing unit is pulled.

In this instance the detail construction of the means for disconnecting the totalizers has been modified. A pin 224 on the bell-crank 221 works in a slot in a vertical link 225 which at its upper end is pivoted to a lever 226 loosely pivoted on a certain rock shaft 227 of the machine. A pin 228 on said lever overlies the curved arm of a coupling hook lever 230 pivoted at 84 to the arm 82 and having a hook-like arm engaging a pin 231 on an arm 232 fast on the rock shaft 80. The coupling hook 230 is drawn into engagement with the pin 231 by a spring 233, its motion being limited by a stop pin 234.

The lower shaft 81 has an arm 235 fast thereon beside the loose arm 95, said arm 235 carrying a pin 236 engaged by a coupling hook lever 237 pivoted to arm 95 and drawn into engagement by a spring 238, its movement being limited by a stop pin 240. The coupling hook 237 is disengaged by a pin 241 on a lever 242 loosely pivoted on a fixed pivot rod 243 and pivoted at 244 to the link 225 which is pulled down as above described whenever an alphabetic position of a type bar is sensed in the unit in question, said pin acting on the tail of the hook lever. An arm 245 fast on the rod 243 is connected with the lever 242 by a restoring spring 246, the action of which is limited by a stop pin 247 on said arm in position to arrest the lever 242.

The interconnecting mechanism for transferring the effect of the sensing mechanism from one unit to another, is shown in this instance in a simpler form. A certain fixed pivot rod 248 has pivoted thereon the two arms of a bail 250, said arms cooperating with pins 251 on the links 225 of two of the units in such a way that an actuation of one of said links resulting from the sensing of an alphabetic position in one unit will be transmitted to the link 225 of the other unit and cause the disabling of the totalizer in said other unit. The slot in the lower end of each link 225 facilitates this action. The bail arms 250 may be variously constructed so as to obtain different results. If each of said arms is forked to embrace the pin 251, then an actuation of either link 225 will be communicated to the other. If the upper tine of the fork of the right-hand arm be omitted, then an actuation of the right-hand link 225 will not be communicated to the left-hand link, but an actuation of the latter will be communicated to the former. It will be obvious that these interconnecting devices may be modified in various ways.

While I have described what I consider to be highly desirable embodiments of my invention, it is obvious that many changes in form could be made without departing from my invention, and I, therefore, do not limit myself to the exact form herein shown and described, nor to anything less than the whole of my invention as hereinbefore set forth, and as hereinafter claimed.

What I claim as new and desire to secure by Letters Patent is:

1. In a machine of the class described, the combination of a series of type carriers having interspersed numeral and alphabet types, feelers one for each carrier, each said carrier having such a configuration that its feeler is obstructed by a high point at numeric and not at alphabetic settings of said carrier, means for causing said feelers to sense said carriers, a universal bar operated by any feeler not so obstructed, and a control member controlled by said universal bar.

2. In a machine of the class described, the combination of a series of differentially settable members, a set of interspersed numeric and alphabetic types settable with each of said members, a series of feelers one for each of said members, each member having a high point presented to its feeler at each numerical setting thereof, a universal bar displaceable by any feeler that fails to find a high point, and a control device controlled by said universal bar.

3. In a machine of the class described, the combination of a series of differentially settable members, a set of interspersed numeric and alphabetic types settable with each of said members, a series of feelers one for each of said members, each member having a high point presented to its feeler at each numerical setting thereof, a universal bar displaceable by any feeler that fails to find a high point, a totalizer, means to cause numbers set up on said members to be accumulated in said totalizer, and means controlled by said universal bar to disable said totalizer.

4. In a machine of the class described, the combination of a series of differently settable members, a set of interspersed numeric and alphabetic types settable with each of said members, a series of feelers one for each of said members, each member having a high point presented to its feeler at each numerical setting thereof, a universal bar displaceable by any feeler that fails to find a high point, type hammers for said types, zero couplers settable into and out of condition to cause said hammers to print significant zeros, and means controlled by said universal bar to change the set-up of said zero couplers.

5. In a machine of the class described, the combination of a series of members each settable to numeric positions and to other positions, a plurality of totalizers, means to cause numbers set up in one field of said members to be added in one of said totalizers, and means to cause numbers set up in another field of said members to be added in another of said totalizers, means for sensing the set positions of the differential members of one of said fields to distinguish numeric and other set positions thereof, and means controlled by said sensing means to determine the operation and non-operation of both said causing means.

6. In a machine of the class described, the combination of a series of members each settable to numeric positions and to non-numeric positions, a plurality of totalizers, means to cause numbers set up in one field of said members to be added in one of said totalizers and means to cause numbers set up in another field or other fields of said members to be added in said other totalizer or totalizers, means for sensing the set positions of the differential members of one of said fields to distinguish numeric and non-numeric positions, means controlled by said sensing means to determine the operation and non-operation of said one causing means, and interconnecting devices whereby the operation and non-operation of the other causing means are also determined in accordance with that of said one totalizer.

7. In a machine of the class described, the combination of a series of members each settable to numeric positions and to non-numeric positions, a plurality of totalizers, means to cause numbers set up in one field of said members to be added in one of said totalizers and means to cause numbers set up in another field or fields of said members to be added in another of said totalizers, means for sensing the set positions of the differential members of one of said fields to distinguish numeric and non-numeric settings thereof, means controlled by said sensing means to determine the operation and non-operation of said one totalizer, and interconnecting devices whereby the operation and non-operation of the other totalizer or totalizers are also determined in accordance with that of said one totalizer, said interconnecting devices being settable to active and to inactive condition.

AUGUST H. MASCHMEYER.